UNITED STATES PATENT OFFICE.

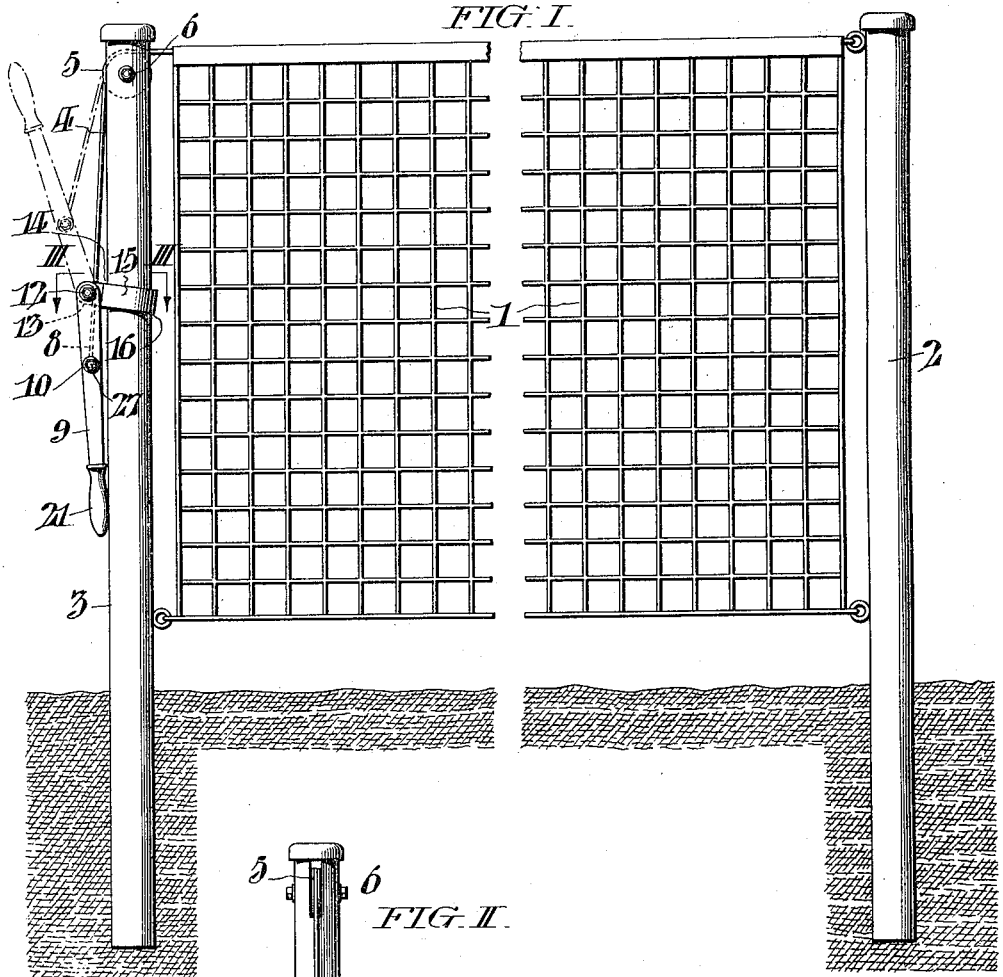

GEORGE LANE, OF HAVERFORD, PENNSYLVANIA.

APPARATUS FOR SUPPORTING LAWN-TENNIS NETS AND THE LIKE.

1,224,388.

Specification of Letters Patent.

Patented May 1, 1917.

Application filed April 27, 1916. Serial No. 93,839.

*To all whom it may concern:*

Be it known that I, GEORGE LANE, a subject of the King of Great Britain, and residing in Haverford, in the county of Montgomery and State of Pennsylvania, have invented certain new and useful Improvements in Apparatus for Supporting Lawn-Tennis Nets and the like, whereof the following is a specification, reference being had to the accompanying drawings.

The object of the invention is to provide an apparatus for supporting lawn tennis nets and the like, in such a manner as not to be affected by any slack or increase in the line due to stretching of the net. The apparatus ordinarily employed for tightening and stretching lawn tennis nets comprises mechanism including a reel and handle, upon which the line may be wound. With such construction, however, the line must be continuously taken up, as the net stretches under the strain of usage, so that it accumulates on the reel and is apt to become caught or jammed which prevents its operating satisfactorily. On the other hand, sliding means have been employed in order to take up any stretching or increase in the line, and which are fastened by causing the means to bind against the post. But with such means it is not ordinarily possible to get sufficient leverage to stretch the net to the desired degree of tightness, nor is it possible to hold the sliding element at the point of utmost stretch in the locking operation, which necessitates a loosening of the net.

In my invention, however, I employ such slidable means, but at the same time provide that the locking means shall be operated by a separate member, which instead of loosening the net in locking, tightens it still further.

To this end I provide a ring slidably mounted on the supporting post and tightening means carried thereby. These tightening means are so arranged that when the net is stretched taut they are locked in position and the strain of the net itself operates to cause the ring to bind against the supporting post and prevent it from sliding.

Referring to the accompanying drawings, Figure I, is an erected tennis net illustrating the application of my invention thereto.

Fig. II, is an elevation of a portion of the supporting post illustrated on the left side of Fig. I.

Fig. III, is a detail cross-section on line III—III of Fig. I.

In carrying out my invention, I support the net 1, between posts 2, and 3, made of any suitable shape or construction. The net 1, is firmly secured at one end to the post 2, by any convenient means, while the line or supporting rope 4, at the other end passes over the pulley 5, pivoted at 6, in the post 3, in such a manner as to hold the net at its proper height.

The free end 8, of line 4, is secured to lever 9, at the point 10, in a manner hereinafter described. Lever 9, is pivoted at 12, to an extension 13, carried by ring 15, which is slidably mounted on the post 3. Ring 15, is of diameter slightly greater than that of post 3, and sufficient play provided between the two to permit of its being turned to a slight angle to the horizontal, as shown in Fig. I. In this position the upper outer edge 14, and the lower inner edge 16, are brought into contact with the sides of post 3, so as to cause it to bind against the post and prevent it from sliding.

Extension 13, carried by ring 15, is composed of two lugs 17, and 18, spaced a slight distance apart. Lever 9, is also composed of two arms 19, and 20, similarly spaced apart at the pivotal end but converging at the other end where they are united in handle 21. Arms 19, and 20, are pivoted in lugs 17, and 18, respectively on pins 22, and 23, which project outwardly from their respective lugs and are fastened on the outside by nuts 24, and 25. In this way lever 9, is securely pivoted to extension 13, but the space between lugs 17, and 18, is left free and clear as best shown in Fig. III. This space is occupied in certain positions of the lever by line 4, which is secured between the two arms 19, and 20, of lever 9, at the point 10, to bolt 27, which passes through arms 19, and 20, and is held in place by nuts 28, and 29, as shown in Fig. II.

In operation net 1, is first securely fastened at one end, to post 2, and line 4, extending from the other end, passed over pulley 5, and secured to lever 9, at the point 10, as indicated. The net is then tightened by hand as much as conveniently may be. During this operation lever 9, occupies its upper position as shown in the dotted lines in Fig. I, thereby allowing ring 15, to slide down post 3, as far as it will go. Lever 9, is then moved from its upper position to the lower position as shown in the full lines in the drawing. In so doing the end 8, of line 4, is moved downwardly twice the distance of the point 10, from the pivot 12, thereby taking up the line that much and tightening the net. But due to the fact that pivot 12, is on an extension which projects outwardly from post 3, the point 10, will in this motion be carried past the dead center of this pivot. That is, line 4, extending from the pulley 5, to point 10, is moved toward post 3, and passes between lugs 17, and 18, to a point within a line drawn from pulley 5, to pivot 12. In this position the force exerted by the weight of the net and the tension of line 4, tends to move lever 9, inwardly and hold it against post 3, thereby locking it securely. At the same time the upward force exerted by the tension of line 4, at point 10, acting on the extension 13, through the pivot 12, moves ring 15, from its horizontal and slidable position to the inclined position shown in Fig. I, and causes the edges 14, and 16, to bite into the post 3, preventing the ring from sliding and thereby securely locking the whole in this position.

Throughout the specification I have used the words "line" and "pulley," to indicate any appropriate means used for supporting the tennis net, at the proper height. My invention is not, therefore, limited to the precise details of construction shown, provided the essential element of a slidable locking means is present.

Having thus described my invention, I claim:

1. In an apparatus for supporting lawn tennis nets and the like, the combination of a supporting post, means adapted to bind on said post slidably mounted thereon; a lever pivoted to said means, said lever being so connected to the tennis net that the strain of the net when taut causes the lever to co-operate with said means to prevent it from sliding on said post.

2. In an apparatus for supporting lawn tennis nets and the like, the combination of a supporting post, a ring slidably mounted on said post, a lever pivoted to said ring and attached to the net, adapted to tighten the net and also to cause the ring to bind on the post so as to prevent it from sliding.

3. In an apparatus for supporting lawn tennis nets and the like, the combination of a supporting post; a ring slidably mounted on said post; a lever pivoted to said ring having the net attached to it between the handle and the pivot, so that in its lowered position it tightens the net and causes the ring to bind against the post, whereby it is prevented from sliding on the post.

4. In an apparatus for supporting lawn tennis nets and the like, the combination of a supporting post, a line extending from the net, a ring slidably mounted upon said post, an extension carried by said ring and a lever pivoted thereto, said line being attached to said lever in such a manner that when the lever is in its lowered position the line is moved past the dead center of the pivot, whereby the lever is locked in said position and the ring caused to bind against said post so as to prevent it from sliding.

5. In an apparatus for supporting lawn tennis nets and the like, the combination of a supporting post, a pulley pivoted in said post, a line extending from the net passing over said pulley, a ring slidably mounted on said post, an extension carried by said ring, and a lever pivoted therein, said line being attached to said lever in such a manner that when said lever is in its lower position, the line is carried toward the post so that it occupies a position within a line drawn from the pulley to the pivot, whereby the strain on the net locks the lever in this position and causes the ring to bind against the post so as to prevent it from sliding.

6. In an apparatus for supporting lawn tennis nets and the like, the combination of a supporting post, a line extending from the net, a ring slidably mounted on said post, a pair of lugs carried by said ring, and a lever pivoted to said lugs, said line being attached to said lever in such a manner that when the lever occupies its lower position, the line lies between the lugs.

7. In an apparatus for supporting lawn tennis nets and the like, the combination of a supporting post, a line extending from the net, a ring slidably mounted on said post, a pair of lugs carried by said ring, and a lever composed of two arms each pivoted to one of said lugs respectively, said line being attached to said lever between said arms in such a manner that when the lever is in its lower position, the line occupies a position between the arms and the lugs.

In testimony whereof, I have hereunto signed my name at Philadelphia, Pennsylvania, this twenty-fourth day of April, 1916.

GEORGE LANE.

Witnesses:
JAMES H. BELL,
E. L. FULLERTON.